United States Patent
Edpalm et al.

(10) Patent No.: US 12,047,690 B2
(45) Date of Patent: Jul. 23, 2024

(54) GENERATING SUBSTITUTE IMAGE FRAMES BASED ON CAMERA MOTION

(71) Applicant: Axis AB, Lund (SE)

(72) Inventors: Viktor Edpalm, Lund (SE); Song Yuan, Lund (SE); Raphael Teller, Lund (SE)

(73) Assignee: AXIS AB, Lund (SE)

( * ) Notice: Subject to any disclaimer, the term of this patent is extended or adjusted under 35 U.S.C. 154(b) by 320 days.

(21) Appl. No.: 17/498,251

(22) Filed: Oct. 11, 2021

(65) Prior Publication Data
US 2022/0132030 A1    Apr. 28, 2022

(30) Foreign Application Priority Data
Oct. 23, 2020  (EP) .................................. 20203624

(51) Int. Cl.
| | | |
|---|---|---|
| *H04N 23/951* | (2023.01) | |
| *H04N 19/176* | (2014.01) | |
| *H04N 19/52* | (2014.01) | |
| *H04N 19/85* | (2014.01) | |

(52) U.S. Cl.
CPC ........... *H04N 23/951* (2023.01); *H04N 19/52* (2014.11); *H04N 19/85* (2014.11); *H04N 19/176* (2014.11)

(58) Field of Classification Search
CPC ...... H04N 23/951; H04N 23/08; H04N 19/52; H04N 19/85; H04N 19/176; H04N 19/132; H04N 19/587; H04N 7/0137; H04N 7/014; H04N 5/262
See application file for complete search history.

(56) References Cited

U.S. PATENT DOCUMENTS

| | | | |
|---|---|---|---|
| 5,973,733 A | * | 10/1999 | Gove ..................... H04N 23/68 348/700 |
| 8,494,054 B2 | | 7/2013 | Nair et al. |
| 8,660,186 B2 | | 2/2014 | Lee et al. |
| 2003/0156646 A1 | | 8/2003 | Hsu et al. |

(Continued)

FOREIGN PATENT DOCUMENTS

| | | |
|---|---|---|
| EP | 1377036 A2 | 1/2004 |
| EP | 1377036 A3 | 3/2004 |

(Continued)

OTHER PUBLICATIONS

Extended European Search Report dated Mar. 1, 2021 for European Patent Application No. 20203624.0.

*Primary Examiner* — Twyler L Haskins
*Assistant Examiner* — John H Morehead, III
(74) *Attorney, Agent, or Firm* — Volpe Koenig

(57) ABSTRACT

Methods and apparatus, including computer program products, for processing a stream of image frames captured by a camera system. When an image frame from the stream of image frames is dropped, a current camera movement is determined. A substitute image frame for the dropped image frame is generated. The substitute image frame comprises a reference to a previous image frame and includes one or more motion vectors estimated solely based on the determined current camera movement. Remaining image frames in the stream of image frames are encoded and the substitute image frame is inserted at the place of the dropped image frame in the stream of encoded image frames.

13 Claims, 3 Drawing Sheets

(56) References Cited

U.S. PATENT DOCUMENTS

| | | | |
|---|---|---|---|
| 2009/0141166 A1* | 6/2009 | Kim | H04N 19/166 |
| | | | 348/425.2 |
| 2010/0053345 A1* | 3/2010 | Kim | H04N 5/772 |
| | | | 348/208.4 |
| 2011/0200296 A1* | 8/2011 | Ohbitsu | H04N 19/156 |
| | | | 386/230 |
| 2013/0128981 A1* | 5/2013 | Kazui | H04N 19/17 |
| | | | 375/240.12 |
| 2014/0294320 A1 | 10/2014 | Kokaram et al. | |
| 2016/0269639 A1 | 9/2016 | Chang | |
| 2017/0085740 A1* | 3/2017 | Lin | H04N 23/683 |
| 2018/0227502 A1* | 8/2018 | Menachem | H04N 23/951 |

FOREIGN PATENT DOCUMENTS

| | | |
|---|---|---|
| WO | 2009/076471 A1 | 6/2009 |
| WO | 2012/012914 A1 | 2/2012 |

* cited by examiner

GENERATING SUBSTITUTE IMAGE FRAMES BASED ON CAMERA MOTION

FIELD OF INVENTION

This invention relates to processing of image data and more specifically to processing a stream of image frames captured by a camera system.

TECHNICAL BACKGROUND

Pan, Tilt, Zoom (PTZ) cameras are an essential part of many modern surveillance systems. These cameras are often under a heavy CPU load when performing a PTZ motion, in particular when running analytical applications together with something else such as a privacy mask, and at the same time the instantaneous bitrate is also high. This makes it likely that one or more image frames in the series of image frames captured by the camera is dropped at some place in the camera.

The best controlled drop today is to produce a repeat image frame and stop some processing on the repeat image frame, but most applications will still process the image frame, thus keeping the CPU load high. Repeating an image frame during a PTZ motion produces a clear disruption in the PTZ motion when the captured video is viewed on a display. Repeating an image frame also adds latency to the PTZ controller. Thus, there is a need for better mechanisms for handling image frames that are dropped from a stream of image frames.

U.S. Pat. No. 5,973,733 describes a system for stabilizing a video recording of a scene made with a video camera. The video recording includes video and audio data. The system includes source frame storage for storing source video data as sequential frames. The system also includes a processor for running a motion estimation algorithm that analyzes motion vectors in an image to detect camera movement occurring during recording, and for modifying the video data to compensate for the camera movement. Additionally, the system includes destination frame storage for storing the modified video data as plurality of sequential frames.

U.S. Patent Publication No. 2016/269639 describes a method of editing video to improve the apparent stability of the video footage. In this method, the apparent stability of the video image is improved by adding a border around an image captured within individual video frames and adjusting the relative position of consecutive video frames according to a negative of a movement vector calculated between the two consecutive frames.

European Patent No. 1 377 036 describes an automatic video enhancement system and method for automatically enhancing video. The automated video enhancement method uses frame-to-frame motion estimation as the basis of the video enhancement. Motion estimation includes the computation of global motion (such as camera motion) and the computation of local motion (such as pixel motion). The automated video enhancement method includes generating global alignment transforms, generating optic flow vectors, and using these global alignment transforms and optic flow vectors to enhance the video. Video processing and enhancement techniques that use the frame-to-frame motion estimation are also incorporated herein. These techniques include a deinterlace process, a denoise process, and a warp stabilization process that performs both damped and locked stabilization.

SUMMARY

According to a first aspect, a method, performed in a camera system, for processing a stream of image frames captured during a camera movement, includes:
   when an image frame from the stream of image frames is dropped due to an inability to complete all operations on the image frame within an allotted time period, determining a current camera movement;
   generating a substitute image frame for the dropped image frame, wherein the substitute image frame comprises a reference to a previous image frame and includes one or more motion vectors estimated solely based on the determined current camera movement; and
   encoding remaining image frames in the stream of image frames and inserting the substitute image frame at the place of the dropped image frame in the stream of encoded image frames.

The current camera movement, which is used to generate the substitute image frame, describes how the camera system, and specifically how an image capturing part of the camera system, has moved since the last encoded frame, that is, from a start position of the last encoded image frame to an end position of the dropped image frame, and possibly also a trajectory between the start and end positions. Knowing the current camera movement makes it possible to determine one or more motion vectors and generate a substitute image frame from these motion vectors, that approximates the contents of the dropped image frame. The substitute image frame is then inserted at the place of the dropped image frame. As a result, the video can remain "alive" and responsive, keeping the latency low and the video smooth while also reducing the load on the camera system, thereby reducing the risk of further image frame drops. Further, this method can be applied both to intentional image frame drops that are made preventatively and to unintentional image frame drops that are a consequence of the camera having a computational load that is too high. A further benefit of using this method is a reduction in bitrate, since there is less change between images and generating and inserting the substitute image frame into the stream of encoded image frames is very cheap in terms of computational resources—often cheaper than re-encoding the same image frame.

According to one embodiment, the current camera movement is determined based on readings from one or more of: a gyroscope and a motor in the camera system. Gyroscope and camera readings are continuously logged in a cache in the camera system and can thus be easily obtained for motion vector calculation purposes. Furthermore, the readings typically have high granularity, that is, there is usually at least one reading per image frame, and sometimes much more than that, making it easy to obtain data for calculation of motion vectors for an entire image frame or part of an image frame.

According to one embodiment, the current camera movement is determined by comparing current gyroscope and motor readings with corresponding gyroscope and motor readings for a previous image frame. By knowing the time a previous image frame was recorded, the corresponding gyroscope and/or motor readings can be retrieved and compared with the current readings, which gives a current camera movement. This provides for a quick and computationally efficient ways of calculating motion vectors for the substitute image frame.

According to one embodiment, the previous image frame is the most recent previous image frame. Using gyroscope and motor positions corresponding to the most recent previous image frame improves the accuracy of the motion vector calculation, since it uses the "freshest" camera motion data.

According to one embodiment, the one or more motion vectors comprise a single global motion vector for the entire substitute image frame. Having a single motion vector for the entire image frame results in a very low-cost motion vector calculation, which may be desirable especially in camera systems or other types of imaging systems that have low computing power or where the bandwidth is limited.

According to one embodiment, the motion vectors comprise a plurality of motion vectors, each of which represents the motion of a block of pixels comprised in the substitute image frame. A camera's motion, e.g., the motion of the image capturing part of the camera system, may affect different parts of an image frame in varying ways, e.g., in a PTZ motion, corner blocks may move differently from blocks in the center of the image frame. To compensate for this phenomenon, it may be preferable to calculate different motion vectors for different blocks of pixels comprised in the image frame referenced by the substitute image frame when the substitute image frame is generated, in order to create a smooth viewing and camera control experience for an operator and provide the "sense" that no image frames were dropped. However, this also requires more computing resources compared to when a single global motion vector is computed for the entire substitute image frame.

According to one embodiment, the plurality of motion vectors represent the motion of one or more interesting portions comprised in the substitute image frame. There may be situations in which there is no, or very little, change between the previous image frame and the dropped image frame. For example, the majority of the scene depicted in the image frame may show a wall, a blue sky, or a similar environment, which does not change very much, if at all, and there may only be a small part of the image frame that is of interest for the user. In such a scenario, there would be little or no point in calculating motion vectors for the stationary parts, and instead computational resources can be saved by only calculating motion vectors for the interesting parts of the image. What is considered to be "interesting," and how large this part is, can be decided on a case by case basis, depending on the particular setup at hand.

According to one embodiment the method further comprises adjusting data for one or more subsequent image frames such that the substitute image frame is not used as a reference image frame by the one or more subsequent image frame. Since the substitute image frame is a made up image frame, it is important that subsequent image frames do not refer to the substitute image frame when processing image data. Therefore, reference data in the subsequent image frames is adjusted such that it points to an image frame prior to the substitute image frame.

According to one embodiment, the substitute image frame is one of: a forward predicted image frame (P-frame) and bidirectionally predicted image frame (B-frame). P-frames and B-frames, respectively, are conventional image frame types that are widely used in video processing. Using these types of image frames enables easy integration of the with existing systems and standards.

According to one embodiment, the camera system is one of: a Pan Tilt Zoom (PTZ) camera and a Body Worn Camera (BWC). These are two common types of camera systems that are used in various types of surveillance settings. Using the concepts in these contexts increases the versatility of the camera system.

According to one embodiment, the stream of image frames is a live view stream of image frames and the method further comprises: simultaneously capturing a recording stream of image frames, wherein the recording stream of image frames does not include any substitute image frames. That is, the live stream of image frames can contain the substitute image frames, which creates a pleasant experience to a user viewing the stream of image frames. At the same time, a second stream of image frames can be recorded, in which image frame drops are allowed and no substitute image frames are generated, and this second stream of image frames can be used for subsequent storage or forensic purposes, when it is not as important to have the live, smooth view.

According to one embodiment, the substitute image frame is an encoded image frame containing pre-calculated motion vectors. As an alternative to calculating motion vectors for the substitute image frame, there may be "pre-calculated" substitute image frames, such that instead of calculating motion vectors when an image frame is dropped, an encoded image frame with pre-calculated motion vectors could simply be retrieved from a library, based on the determined camera movement. This may further significantly reduce the computational load of the camera and may be particularly useful in situations with lower computing power.

According to one embodiment, the image frame is proactively dropped to reduce the risk of an unintentional drop of an image frame. As was mentioned above, sometimes it may be beneficial to drop an image frame on purpose in order to prevent accidental dropping of image frames. The method allows for such proactive dropping of image frames, thereby increasing the versatility and allowing for more controlled dropping of image frames compared to when they occur as a result of a computational overload.

According to a second aspect, a camera system includes an image capturing part, an image processing pipeline and an encoder. The image capturing part is configured to capture a stream of image frames during a camera movement. The image processing pipeline is configured to:
  when an image frame from the stream of image frames is dropped due to an inability to complete all operations on the image frame within an allotted time period, determine a current camera movement;
  generate a substitute image frame for the dropped image frame, wherein the substitute image frame comprises a reference to a previous image frame and includes one or more motion vectors estimated solely based on the determined current camera movement.

The encoder is configured to encode remaining image frames in the stream of image frames and insert the substitute image frame at the place of the dropped image frame in the stream of encoded image frames.

The system advantages correspond to those of the method and may be varied similarly.

According to a third aspect, a computer program for processing a stream of image frames captured by a camera system during a camera movement comprises a computer readable storage medium having program instructions embodied therewith, wherein the computer readable storage medium is not a transitory signal per se. The program instructions are executable by a processor to perform a method comprising:
  when an image frame from the stream of image frames is dropped due to an inability to complete all operations on the image frame within an allotted time period, determining a current camera movement;

generating a substitute image frame for the dropped image frame, wherein the substitute image frame comprises one or more motion vectors estimated solely based on the determined current camera movement; and encoding remaining image frames in the stream of image frames and inserting the substitute image frame at the place of the dropped image frame in the stream of encoded image frames.

The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Overview

As was described above, various embodiments provide improved techniques for handling one or more image frames that are dropped from a stream of image frames. These techniques can be applied in a variety of contexts. Two of the more common examples include Pan Tilt Zoom (PTZ) cameras and Body Worn Cameras (BWCs), but there may even be stationary camera systems that experience image frame drops for various reasons, for example, if they are subject to shaking. The concepts will be described herein by way of example and with reference to PTZ cameras and PTZ motion, as these are easy concepts to understand. However, it should be realized that the same principles can be applied to BWCs or other types of camera systems and that the examples presented herein should not be construed as being limited to particular types of cameras or imaging systems.

When an image frame is dropped during a PTZ motion, i.e., a PTZ motion of an image capturing part, the estimated motion is logged and a substitute image frame is generated for the dropped image frame. The substitute image frame includes one or more motion vectors, which are estimated with reference to a previous image frame and which are only based on the estimated PTZ motion. The PTZ motion can be estimated, for example, from readings from a camera gyro recording the PTZ motion of the image capturing part or from data from the motor controlling the PTZ motion of the image capturing part. The substitute image frame is typically encoded as a P-frame referring to a previous image frame. The remaining image frames in the stream of image frames are encoded, and the substitute image frame is inserted at the place of the dropped image frame in the stream of encoded image frames. This allows the video to still be "alive" and responsive, keeping the latency low and the video smooth while also reducing the load on the camera system, thereby reducing the risk of further image frame drops. Various embodiments will now be described by way of example and with reference to the drawings.

Figure 1:
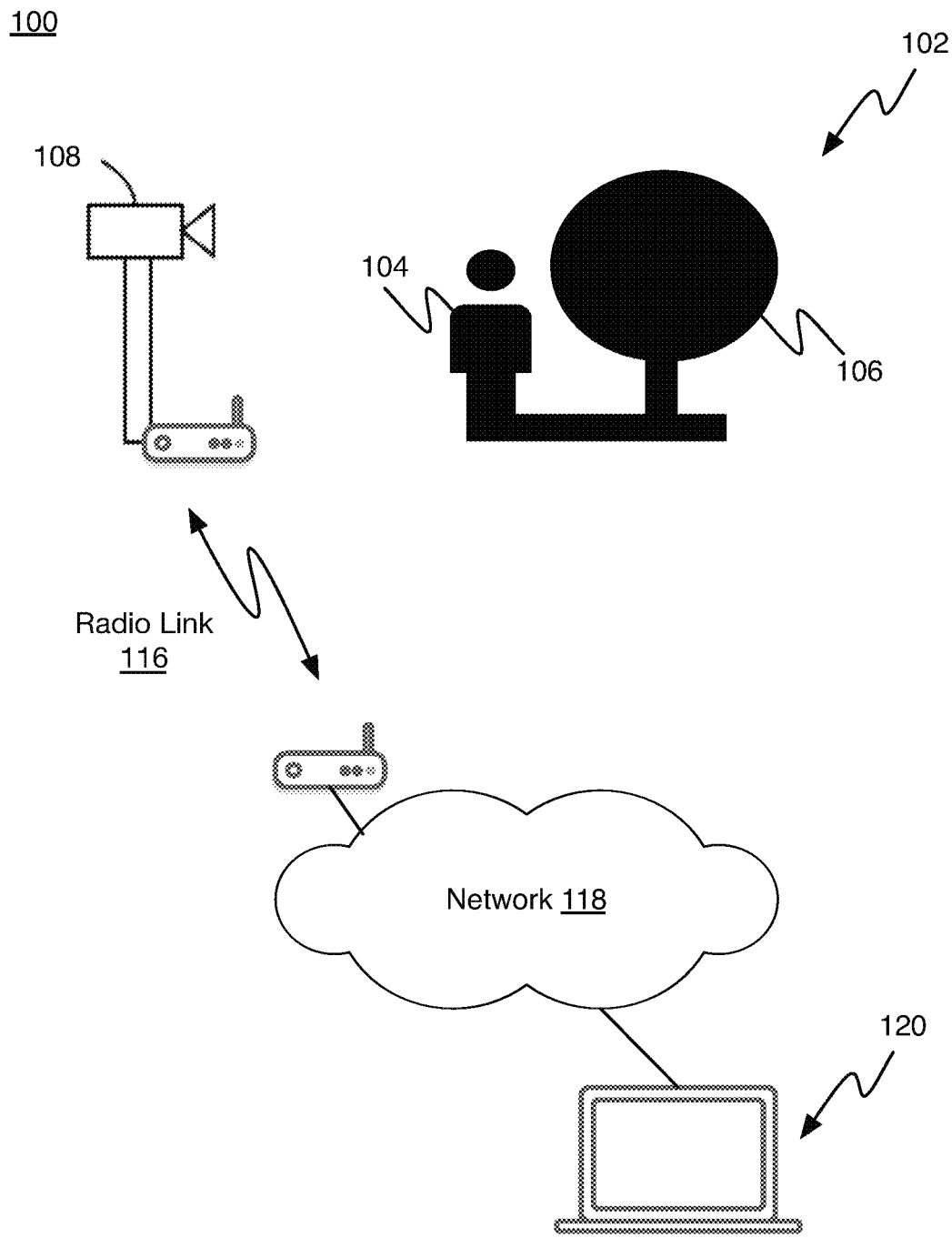
FIG. 1 is a schematic diagram showing an exemplary environment 100, in accordance with one embodiment, in which various methods and systems can be applied.

FIG. 1 shows a schematic diagram of an exemplary environment 100 in which various embodiments can be implemented. As can be seen in FIG. 1, a scene 102 with a person 104 and a tree 106 is captured by a camera system 108. In order to facilitate the legibility of this description the camera system 108 will sometimes be referred to herein simply as a "camera" but again it should be noted that many types of camera systems 108 that fall within the scope of the claims, such as PTZ cameras, stationary cameras, Body Worn Cameras (BWC), etc. It should further be noted that this depiction of the scene 102 is merely a simplistic view for illustrative purposes. A scene 102 can be described in a more general sense as any three-dimensional physical space whose size and shape is defined by the field of vision of a camera recording the scene.

Figure 2:
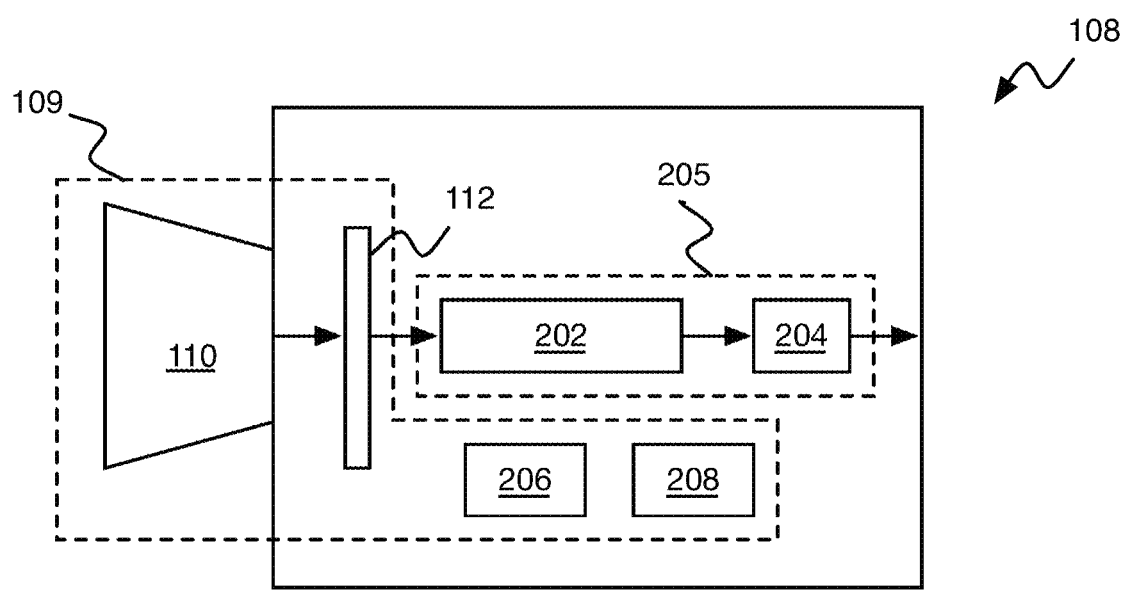
FIG. 2 is a block diagram showing a detailed view of the camera system 108 illustrated in FIG. 1, in accordance with one embodiment.

The camera system 108, which is illustrated in more detail in FIG. 2, has an image capturing part 109 comprising a lens 110 and an image sensor 112. The lens 110 captures the scene 102 and projects it onto the image sensor 112. The image sensor 112 captures a series of images, which together form a video stream. The camera system 108 further comprises an image processing pipeline 202 and an encoder 204, both of which will be described in further detail below. The image processing pipeline 202 and the encoder 204 may be comprised in an image processing and encoding part 205 of the camera system 108. In some embodiments, the image processing and encoding part 205 may be arranged co-located with the image capturing part 109. In some alternative embodiments, it may be arranged separated from but in wired or wireless communication with the image capturing part 109. The image capturing part 109 and the image processing and encoding part 205 may be arranged in for example a single unit or in two separate units so that images captured by the image capturing part 109 are processed and encoded by the image processing and encoding part 205. Thus, even if the camera system 108 is illustrated in FIG. 2 as a single unit it should be understood that parts of the camera system 108 may be arranged at separate units, possibly arranged at a distance from each other. The image processing pipeline 202 takes the signal from the image sensor 112 and performs various types of image processing operations, before sending the image data to the encoder 204, which encodes the video stream into a format that is suitable for transmission over a network to a user. In FIG. 1, the encoded video is transmitted wirelessly over a radio link 116 to a wired network 118, and eventually to a client 120, which is connected to the network 118, but of course there are many combinations of wireless and wired transmission models that can be used. The camera system 108 illustrated in FIG. 2 also includes one or more motors 206, which are used to move the camera system 108, i.e., especially to move the image capturing part 109, and one or more gyroscopes 208, which is used to determine a position of the camera system, i.e., the position of the image capturing part 109. The one or more motors 206 and/or the one or more gyroscopes 208 may be comprised in or arranged at the image capturing part 109 in order to control and determine the movement of the image capturing part 109. As previously mentioned, this movement is in this disclosure referred to as the camera movement.

The client 120 has a display screen where a user can view the image video stream from the camera. Typically, the client 120 is also used to control the camera 108, for example, by the user issuing PTZ control commands at the client 120. For example, a user may instruct the camera to zoom in on a particular detail of the scene 102, or to track the person 104 if she starts to move away from the tree 106. When controlling the camera, it is important that the latency is as low as possible, i.e., the user experiences the camera to be as "responsive" as possible to their control commands.

However, as described above, during a camera movement, the camera often experiences a high computational load due to a number of factors. As described above, PTZ cameras are often under heavy CPU load when performing a PTZ motion, in particular when running analytical applications together with something else such as a privacy mask, and at the same time the instantaneous bitrate is also high. The computational load on the camera is high when the camera cannot complete all required operations on the image frame within an allotted time period. When all the operations on an image frame cannot be completed in an allotted time period, the image frame is dropped, either intentionally or unintentionally. This may be the case when the IPP 202, due to high computational load during the camera movement, is unable to complete all required processing operations on the image frame within the allotted time period. As exemplified below, the processing operations performed by the IPP 202 may comprise noise filtering, distortion correction, global and/or local tone mapping, transformation, flat-field correction, application of overlays (e.g., privacy masks), and analytical applications performing object detection and/or object recognition. For example, in the case of a privacy mask operation not being able to be completed in the allotted time period, it is typically a better choice to drop the image frame compared to keeping the image frame without any privacy mask or with only a partly drawn privacy mask. As another example, in case the noise filtering, distortion correction, global and/or local tone mapping, transformation, and/or the flat-field correction not being able to be completed in the allotted time period due to the high computational load, it may be better to drop the image frame compared to keeping the image frame without the noise filtering, distortion correction, global and/or local tone mapping, transformation, and/or the flat-field correction as the keeping of such an image frame likely would negatively affect the appearance of the video stream. This exemplifies an intentional dropping of the image frame in order to avoid a certain negative effect. However, as mentioned above, the dropping may be unintentional. Thus, the image frame may be unintentionally dropped due to the computational load being too high for the IPP 202 to be able to complete all required operations within the allotted time period. For example, some of the required operations, such as analytical application operations performing object detection or object recognition, need a certain amount of available computational/processing resources in order to perform the object detection or object recognition on the image frame, and if the computational load on the IPP 202 is too high, e.g., due to the camera movement, the IPP's 202 available computational/processing resource may be smaller than the certain amount of available computational/processing resources needed for the analytical application operation to be completed. Thus, the IPP 202 may not have sufficient available computational/processing resources to complete all required operations within the allotted time period and therefore the image frame is dropped. Irrespective of whether the dropping is intentional or unintentional, dropping an image frame creates a disruption in the stream that is shown to the user and creates a video stream that is less pleasing to watch and that also has a sense of higher latency, both of which are undesirable experiences.

Figure 3:
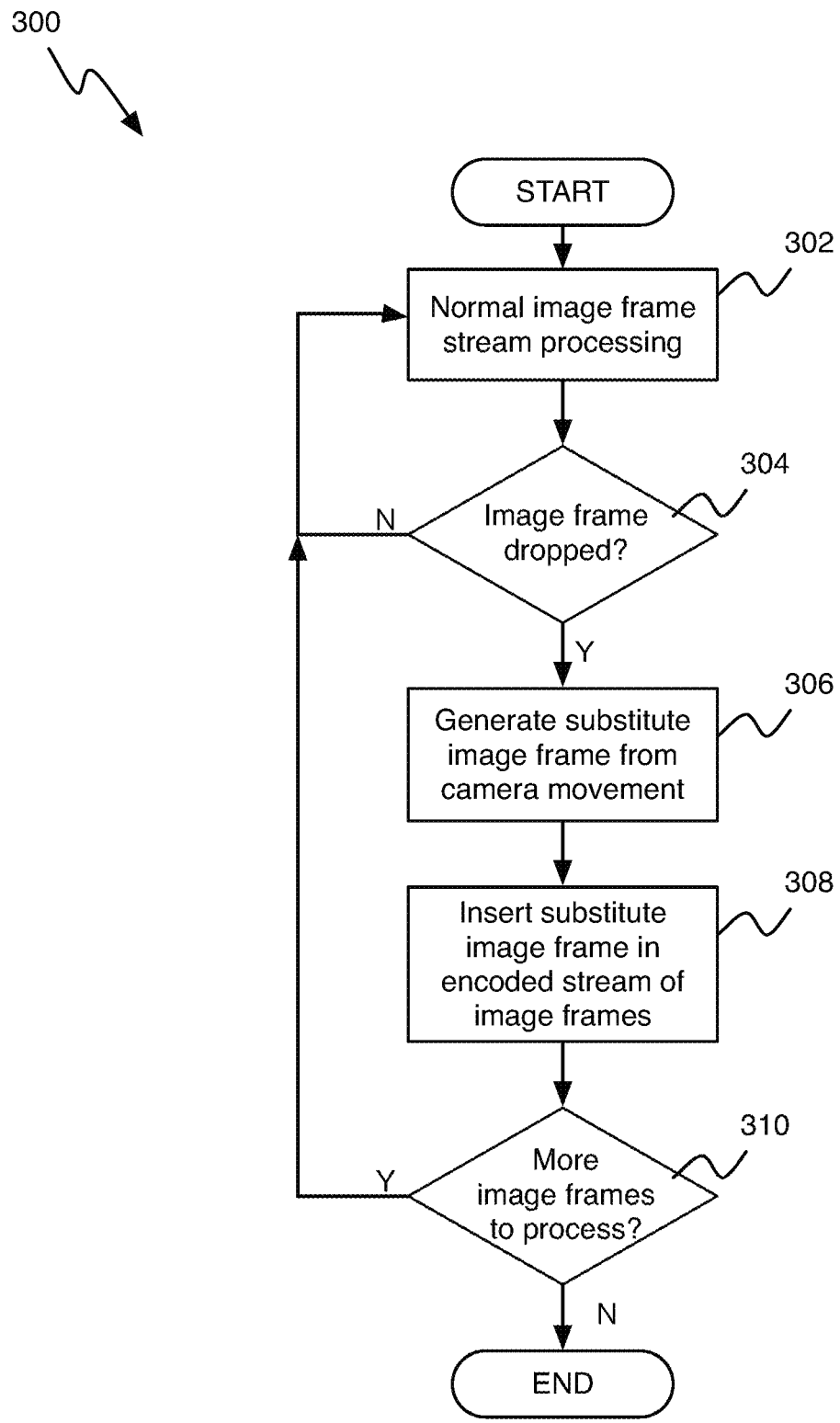
FIG. 3 is a flowchart showing a method for processing a stream of image frames, in accordance with one embodiment.

Therefore, in order to reduce these and other problems, in one embodiment a dropped image frame in a stream of image frames is replaced with a substitute image frame, as will now be described with reference to FIG. 3, which is a flowchart of a method 300 for processing a stream of image frames. As can be seen in FIG. 3, the method starts by processing a stream of image frames in a conventional fashion, step 302. This conventional processing will now be briefly described with reference to FIG. 2, which is a block diagram showing selected components of a camera system 108 that are used in capturing and processing images, in accordance with one embodiment.

As shown in FIG. 2, the camera system 108 includes a lens 110 imaging the scene 102 on an image sensor 112. After possibly performing various operations, typically filtering, demosaicing and color correction by one or more units (not shown), such as a filtering unit, a demosaicing and a color correction unit, of the camera system 108, the resulting image is forwarded to an image processing pipeline (IPP) 202. It should be noted that in some embodiments, the color correction may be done in the IPP 202.

In the IPP 202, further processing is performed on the image. Such further processing may include noise filtering (for eliminating spatial and/or temporal noise), distortion correction (for eliminating effects of e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text, etc.). The IPP 202 may also be associated with an analytics engine (not shown), performing object detection, object recognition, alarms, etc.

Following the image IPP 202, the image may be forwarded to an encoder 204, in which the information is coded according to an encoding protocol and forwarded to the receiving client 120 over the network 118. It should be noted that the camera 108 illustrated in FIG. 2 also includes numerous other components, such as processors, memories, etc., which are common in conventional camera systems and whose purpose and operations are well known to those having ordinary skill in the art. Such components have been omitted from the illustration and description of FIG. 2 for clarity reasons. There are a number of conventional video encoding formats. Some common video encoding formats that work with the various embodiments include: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples. These video encoding formats prescribe temporal video compression implemented in terms of intra image frames and inter image frame. As previously mentioned, the intra image frames may also be referred to as I-image frames, and the inter-image frames may be predictive image frames so called P-frames or bidirectional predictive image frames so called B-frames. An I-image frame can be described as an image frame that is encoded using only the information in the image frame to be encoded. Moreover, the I-frame is calculated from all image data captured for the image frame to be encoded. Therefore, the I-frame sometimes is also referred to as a full image frame.

The P-frames are based on information from previously encoded image frames as well as the information of the presently encoded image frame. The B-frames are based on information from previously, and optionally later, encoded image frames as well as the information of the presently encoded image frame. That is, an inter-image frame may be described as taking advantage of temporally redundant information in previous (and optionally later) image frames. An encoder implementing this type of codec (compression standard) typically generates an I-image frame followed by a predetermined number of inter-image frames, e.g., P- and/or B-frames, and then a new I-image frame followed by the same number of inter-image frames. The length of this sequence of an I-frame followed by a number of inter-image frames is often referred to as a Group of Pictures (GOP) length. For some compression standards, such as H.265, the GOP-length can be adjusted during encoding.

Returning now to FIG. 3, during the normal processing in step 302, there is a continuous monitoring of image frames to detect whether an image frame in the stream of image frames has been dropped, step 304. If no image frame has been dropped, the normal processing continues. However, if it is discovered in step 304 that an image frame has been dropped, a substitute image frame is generated based on camera movement, step 306. As mentioned above, the image frame from the stream of image frames may be dropped due to an inability to complete all operations, e.g., all required operations, on the image frame within an allotted time period. This may be the case when all required operations on the image frame from the stream of image frames cannot be completed in the allotted time period due to the camera system 108 experiencing a high computational load during a camera movement.

In one embodiment, the substitute image frame is generated by creating a P-frame that references a previous image frame and includes motion vectors which are artificially generated from the PTZ camera's motion, e.g., the image capturing part's motion. In addition to the motor 206 that is used to move the PTZ camera, there are also typically one or more gyroscopes 208 in the camera 108. Positional readings from the motor 206 and gyroscopes 208 are continuously stored in a cache in the camera 108, as often as 60-600 times per second. This makes it possible to correlate image frame capture times to positional readings for the PTZ camera 108, e.g., for the image capturing part 109. For example, at the lower end, with 60 positional measurements per second and a 60 FPS (Frames Per Second) capture rate, there would be one positional reading for each image frame in the camera cache, and at the higher end with 600 positional measurements per second and a 60 FPS capture rate, each image frame can be correlated with 10 positional readings, which would allow even better accuracy of estimating the camera's position, e.g., the image capturing part's position, at the time of the image frame capture for the dropped image frame.

Thus, by reading a current position of the PTZ camera 108, e.g., a current position of the image capturing part 109, when an image frame is dropped, and referencing the stored position in the camera cache for the previous image frame, it is possible to determine one or more motion vectors which describe the motion between the previous image frame and the current dropped image frame. These motion vectors can be used to generate a substitute image frame, which can be inserted into the encoded stream of image frames at the location of the dropped image frame. This gives a user the appearance of a continuous, smooth camera movement without any disruptions. The one or more motion vectors can be generated in different ways.

As is well known to those having ordinary skill in the art, it is common to divide an image frame into different blocks and perform image processing on a block level. A PTZ movement is typically "skewed" in the sense that the movement of the blocks in the image vary. For example, the corner blocks move differently from the blocks in the center of the image. Therefore, in a first embodiment, the processing is done on a block-by-block basis and an individual motion vector is determined for each block. In a second embodiment, a global motion vector is determined for the entire image frame. While the first embodiment may produce a better user experience, it also has a higher cost in terms of bitrate, since more information needs to be processed, and therefore the second embodiment may sometimes be more useful, depending on the circumstances at hand.

It should be noted that there are also "hybrid embodiments" between the first and second embodiments. For example, an image can be divided into four or nine tiles, and a motion vector can be determined for each tile. There may be situations where something "interesting" only happens in one of the tiles (e.g., an object is shown in one of the tiles and the remaining eight tiles show blue sky or a solid wall, etc.). In such a scenario, computational resources can be further saved by calculating a motion vector only for the tile of interest, and not process the eight tiles that look unchanged. In another variation, a motion vector can be decided for one block (e.g., 10 pixels up and 15 pixels left), and the camera can be instructed to set all the immediate neighboring blocks to have the same motion vector. Thus, there are many variations that can be envisioned by a person having ordinary skill in the art.

Since the substitute image frame is a made up image frame, it is important that subsequent image frames in the stream of image frames do not use the substitute image frame as a reference when coding their image information. Therefore, the image frame immediately preceding the dropped image frame (that is, the most recent previous image frame) is kept as a reference for subsequent image frames. This can be done in a number of ways. For example, in one embodiment, the substitute image frame has associated metadata or data in its header indicating that it is a "do not use for reference image frame." In another embodiment using the H.264 compression, the QP value can be set to 51 to indicate that the image frame is a substitute image frame. It should be noted that while this example uses the most recent previous image frame, it is also possible to use any older image frame as a reference image frame. However, in most situations the image frame that is the closest in time to the dropped image will be the image frame that has the most relevant content, and therefore be the preferable one to use.

Once the substitute image frame has been generated, it is inserted at the place of the dropped image frame in the encoded stream of image frames, step 308. It is then determined whether there are any more image frames to process, step 310. If so, the normal image processing resumes in step 302, as described above. If there are no more image frames to process, for example, if the camera 108 is turned off or goes to sleep, the process ends.

It should be noted that the image frames in the above example can be dropped from the stream for both intentional and unintentional reasons. For example, an intentional reason for an image frame drop can be if a bandwidth monitor indicates that the bandwidth being used is so high that there is a risk for image frame drops unless the computational load on the camera is reduced. Another example of an intentional image frame drop may be that there may be a second stream of image frames that should have a higher priority, etc. Unintentional image frame drops can occur as described above, when the load on the camera is simply too high for the camera to successfully handle all the steps of the image processing.

It should be noted that while the examples above are focused on using P-frames, the same general principles herein are applicable to B-frames, which can refer both forwards and backwards in the GOP. However, B-frames typically have higher memory requirements compared to P-frames, so in most cases using P-frames would be preferable. It should further be noted that when there are several substitute image frames in the stream of image frames, not all substitute image frames need to have the same type and that there may be any mix of P-frames and B-frames.

Also, the above examples refer to PTZ cameras having a single motor 206. However, it should be realized that the same general principles can also be extended to cameras that contain multiple image sensors and where each image sensor has its own motor 206.

Furthermore, while the computations of the motion vectors in the above example refer to the image frame immediately preceding the dropped image frame, there is nothing that prevents the motion vectors to be determined with reference to an even earlier image frame in the stream of image frames. However, referring to an image frame that is several steps away from the dropped image frame may potentially result in a substitute image frame having less accurate motion vectors, and thereby worse quality, so it may be preferable from a practical point of view to refer to the immediately preceding image frame.

The above examples have been presented in terms of PTZ cameras, but it should be noted that the same principles can be applied to other cameras too such as body worn cameras (BWC) or any camera subjected to strong vibrations and where the risk of image frames being dropped is increased.

In some embodiments, there could also be "pre-calculated" substitute image frames, such that instead of calculating motion vectors when an image frame is dropped, an encoded image frame with pre-calculated motion vectors could simply be retrieved from a library, based on the determined camera movement. This may further significantly reduce the computational load of the camera and may be particularly useful in situations with lower computing power.

There are also embodiments in which the above techniques are applied in a "live stream," (i.e., the stream that a user is viewing on his or her display screen), but where the substitute image frames are not added to the actual forensic stream (i.e., the stream that is recorded and saved for future reference). Thus, many variations can be envisioned by those having ordinary skill in the art.

The camera systems and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages as shown in the embodiments above. Thus, the teachings herein should not be limited to the shown embodiments but should only be defined by the appended claims. Additionally, as the skilled person understands, the shown embodiments may be combined.

The invention claimed is:

1. A method, performed in a camera system, for processing a stream of image frames captured during a camera movement, the method comprising:
   when an image frame from the stream of image frames is dropped from the stream of image frames due to an inability to complete all operations on the image frame within an allotted time period, determining a current camera movement, wherein the dropped image frame is no longer available in the stream of image frames;
   generating a substitute image frame for the dropped image frame, wherein the substitute image frame comprises a reference to a previous image frame and includes one or more motion vectors estimated solely based on the determined current camera movement;
   encoding remaining image frames in the stream of image frames and inserting the substitute image frame at the place of the dropped image frame in the stream of encoded image frames; and
   adjusting data for one or more subsequent image frames such that the substitute image frame is not used as a reference image frame by the one or more subsequent image frames.

2. The method of claim 1, wherein the current camera movement is determined based on readings from one or more of: a gyroscope and a motor in the camera system.

3. The method of claim 2, wherein the current camera movement is determined by comparing current gyroscope and motor readings with corresponding gyroscope and motor readings for a previous image frame.

4. The method of claim 3, wherein the previous image frame is the most recent previous image frame.

5. The method of claim 1, wherein the one or more motion vectors comprise a single global motion vector for the entire substitute image frame.

6. The method of claim 1, wherein the motion vectors comprise a plurality of motion vectors, each of which represents the motion of a block of pixels in the substitute image frame.

7. The method of claim 6, wherein the plurality of motion vectors represent the motion of one or more interesting portions in the substitute image frame.

8. The method of claim 1, wherein the substitute image frame is a one of: a forward predicted image frame, P-image frame, and bidirectionally predicted image frame, B-image frame.

9. The method of claim 1, wherein the camera system is one of: a Pan Tilt Zoom, PTZ, camera and a Body Worn Camera, BWC.

10. The method of claim 1, wherein the stream of image frames is a live view stream of image frames and wherein the method further comprises: simultaneously capturing a recording stream of image frames, wherein the recording stream of image frames does not include any substitute image frames.

11. The method of claim 1, further comprising:
actively dropping the image frame to prevent the image frame being dropped due to an inability to complete all operations on the image frame within an allotted time period.

12. A camera system, comprising:
an image capturing part configured to capture a stream of image frames during a camera movement;
an image processing pipeline configured to:
when an image frame from the stream of image frames is dropped from the stream of image frames due to an inability to complete all operations on the image frame within an allotted time period, determine a current camera movement, wherein the dropped image frame is no longer available in the stream of image frames;
generate a substitute image frame for the dropped image frame, wherein the substitute image frame comprises a reference to a previous image frame and includes one or more motion vectors estimated solely based on the determined current camera movement; and
an encoder configured to encode remaining image frames in the stream of image frames and insert the substitute image frame at the place of the dropped image frame in the stream of encoded image frames, and
adjust data for one or more subsequent image frames such that the substitute image frame is not used as a reference image frame by the one or more subsequent image frames.

13. A computer program product for processing a stream of image frames captured by a camera system during a camera movement, the computer program product comprising a computer readable storage medium having program instructions embodied therewith, wherein the computer readable storage medium is not a transitory signal per se, the program instructions being executable by a processor to perform a method comprising:
when an image frame from the stream of image frames is dropped from the stream of image frames due to an inability to complete all operations on the image frame within an allotted time period, determining a current camera movement, wherein the dropped image frame is no longer available in the stream of image frames;
generating a substitute image frame for the dropped image frame, wherein the substitute image frame comprises a reference to a previous image frame and includes one or more motion vectors estimated solely based on the determined current camera movement;
encoding remaining image frames in the stream of image frames and inserting the substitute image frame at the place of the dropped image frame in the stream of encoded image frames; and
adjusting data for one or more subsequent image frames such that the substitute image frame is not used as a reference image frame by the one or more subsequent image frames.

* * * * *